Aug. 30, 1955         R. A. TAYLOR         2,716,304
CRAB TRAP
Filed May 28, 1951
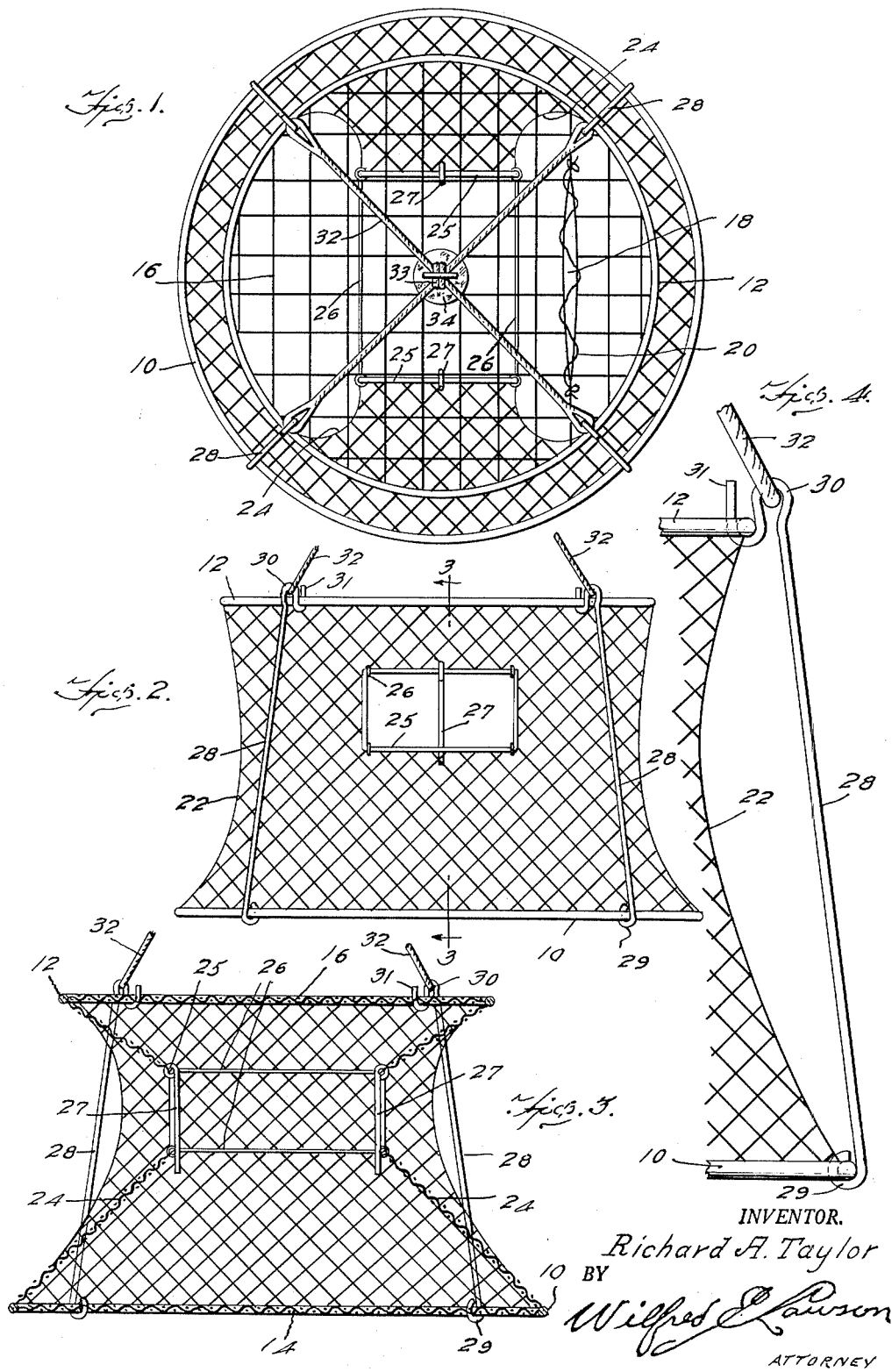
INVENTOR.
Richard A. Taylor
BY
Wilfred E. Lawson
ATTORNEY

United States Patent Office 2,716,304
Patented Aug. 30, 1955

2,716,304

CRAB TRAP

Richard A. Taylor, Bellevue, Wash.

Application May 28, 1951, Serial No. 228,722

1 Claim. (Cl. 43—100)

This invention relates generally to fishing and trapping and is directed particularly to improvements in traps for marine life more especially crabs, lobster, shrimp and other animals of this character.

A particular object of the present invention is to provide an improved trap structure of the above described character which is designed in a novel manner whereby it may be collapsed into a flat unit when desired for storage or transportation, thus making possible the storage or transportation of a large number of the traps in a relatively small space.

Another object of the invention is to provide a trap of the character stated which comprises top and bottom frame parts which are connected by netting and which, when the trap is set up for use, are maintained in spaced relation by rigid connecting bars which are pivotally attached to one of the frame parts and readily detachably connected to the other frame part.

A further object of the invention is to provide in a trap of the above described character comprising upper and lower frame parts or rims, spacing bars which are hinged to one of the parts and detachably connected by hook members to the other part and which are, in addition, provided with loops at their upper ends with which may be connected lifting and anchoring ropes.

The invention will be best understood from a consideration of the following detailed description taken in connection with the accompanying drawing forming a part of the specification, with the understanding, however, that the invention is not to be limited to the exact details of construction shown and described since obvious modifications will occur to a person skilled in the art.

In the drawings:

Figure 1 is a view in top plan of a trap constructed in accordance with the present invention;

Figure 2 is a view in side elevation of the same;

Figure 3 is a sectional view taken substantially on the line 3—3 of Figure 2;

Figure 4 is a fragmentary detail on an enlarged scale, showing one of the spacer rods.

Referring now more particularly to the drawing wherein like numerals of reference indicate corresponding parts in the several views, the numerals 10 and 12 designate respectively lower or bottom and upper or top rim parts or frame parts for the present improved trap structure.

The parts 10 and 12 are here shown as being circular but it is to be understood that while this is a preferred form the invention is not restricted to this particular shape for the parts, since it will be readily apparent that these parts may be made of any other desired shape.

The top and bottom frame or rim parts are made of a suitable water resistant material such as a stainless or non-rusting metal, plastic or any other material of suitable character.

The bottom rim or part 10 is covered by the bottom netting 14 while the top frame part or rim 12 is covered by a similar netting 16 as shown. This netting may be coarse or fine as desired, according to whether the trap is to be used for crabs or lobsters, or for shrimp or smaller marine life.

The top netting 16 is formed with the opening 18 through which the contents of the trap may be removed and the edges of this opening are joined together by the removable cord 20.

The top and bottom rims of the trap are connected by the side wall netting 22 and this is provided at opposite sides of the trap structure with the entrance passageways 24 each of which at its inner end connects with a metal frame 25 outlining the entrance opening. In the set-up trap these frames are connected across the trap by cords 26 whereby the entrance frames are maintained in the proper position.

Each entrance frame has connected with the top thereof, a pivoted drop wire 27 which hangs across the inside of the frame and thus prevents the trapped animals from escaping.

Connected with the bottom rim of the trap to pivot thereon, are a number of spacer rods 28. Each of these rods is formed with an eye 29 at its lower end through which the bottom rim passes so that the rod is readily swingable outwardly or inwardly on the rim, the rods being, of course, outside the side wall net 22.

The free end of each brace rod 28 is formed to provide a loop 30 and one end of this loop is continued back and reversely turned to form the hook 31.

The hooks 31 are so formed, as is readily shown, that when the brace rods are set in upright position the opening of the hook will be directed upwardly. The rods 28 are also of such length so that they will readily span the space between the top and bottom rims of the trap when such rims are separated to approximately the maximum extent permitted by the side wall netting.

Each of the loops 30 of the brace rods 28 has an anchor or lift cord or rope 32 secured therein and these cords are drawn or run together over the center of the trap and where they are tied as indicated at 33, to a single anchor cord.

In order to maintain the lift cords 32 in upwardly extending position with respect to the trap when the trap is submerged in the water, a float body is secured to the upper ends of the cords as indicated at 34. Thus when the trap is placed in relatively shallow water, this float body will readily designate the trap's position.

In setting up the trap for use, the upper frame 12 is raised and the brace rods 28 are then swung upwardly and by pulling up on the top frame or rim 12 the brace rod hooks can be slipped under the rim and the rim then allowed to drop back into the hooks. In this manner the trap will be maintained with the top and bottom rims spaced apart so that the entrance passages or tunnels 24 will be opened and the crabs or other animals can readily pass thereinto through the opening frames 25. When the trap is to be collapsed, all that is necessary is that the upper rim 12 be pulled against the tension of the side wall netting so as to disengage such rim from the hooks 31. The top rim can then be dropped onto the netting of the bottom of the trap and the brace rods can be folded in over the top of the trap and secured to the top netting, thereby reducing the trap to a flat body which can be readily handled and stored.

From the foregoing it will be apparent that there is provided by the present invention a novel collapsible trap structure which is of simple design and which, at the same time, when set up for use will be strong and durable and which, in addition, can be easily and quickly set up or collapsed as desired.

I claim:

In a crab trap, open top and bottom frames, netting covering each of said frames, rods extending between said frames and having their lower ends formed to provide eyes engaged with the bottom frame, the upper ends of said rods being formed to provide outer downwardly opening loops merging into inner upwardly opening loops, said top frame being seated in the latter of said loops, elongate flexible lift elements each secured at one end in said downwardly opening loops, said elements extending upwardly and inwardly and having their free ends interconnected a distance above the vertical center of the trap, a second netting connecting said frames and forming the side wall of the trap, said second netting having a pair of oppositely disposed entrance openings formed therein, a rigid rectangular frame bordering each of said openings, and flexible elements extending between and connecting the latter frames at their corners to draw the said second netting inward about said latter frames to form outwardly flaring passageways leading to said entrance openings and to support said latter frames in alignment.

References Cited in the file of this patent

UNITED STATES PATENTS

| | | |
|---|---|---|
| 616,924 | Heberling | Jan. 3, 1899 |
| 721,913 | Palmer | Mar. 3, 1903 |
| 995,686 | Koch | June 20, 1911 |
| 1,445,763 | Gibbs et al. | Feb. 20, 1923 |
| 1,638,238 | Brautigam et al. | Aug. 9, 1927 |
| 1,958,724 | Stanislaw | May 15, 1934 |

FOREIGN PATENTS

| | | |
|---|---|---|
| 368,686 | Great Britain | 1932 |
| 553,021 | France | May 11, 1923 |